(No Model.)
D. L. SHOEMAKER.
MACHINE FOR CLEANING AND SCOURING RICE, &c.
No. 255,343. Patented Mar. 21, 1882.
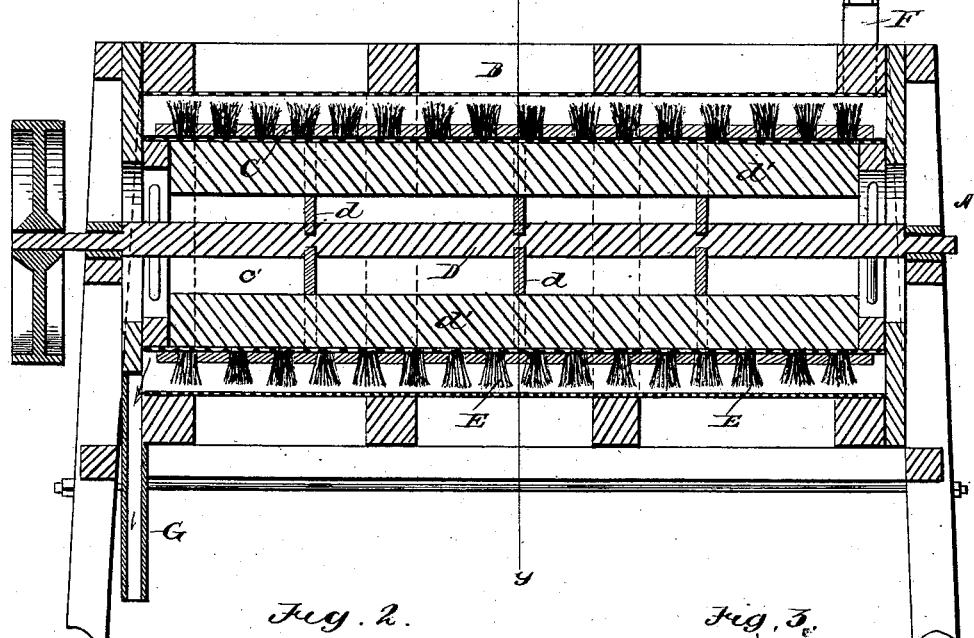
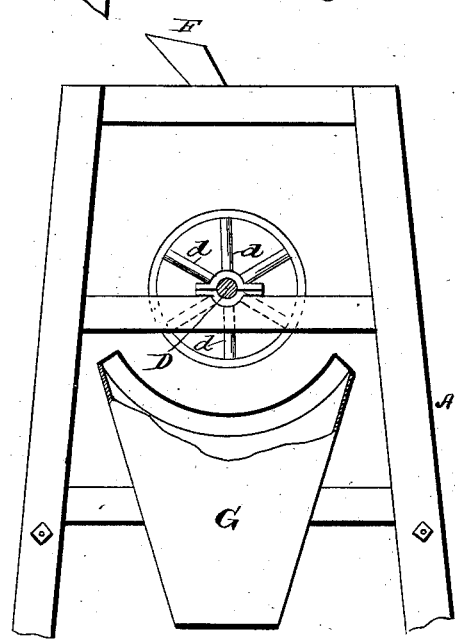
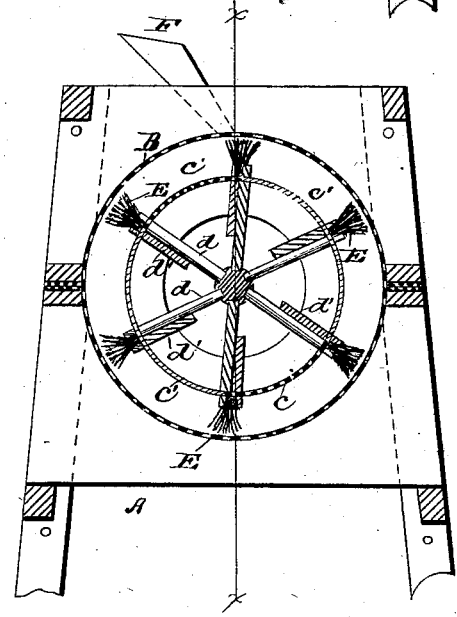
Attest,
W. H. H. Knight
Wm. A. Blackstock
Inventor,
David L. Shoemaker
By Hill & Church
His Atty.

UNITED STATES PATENT OFFICE.

DAVID L. SHOEMAKER, OF WASHINGTON, D. C., ASSIGNOR TO JOHN HUGHES, OF NEW BERNE, N. C., H. MAURICE TALBOTT, OF BALTIMORE, MD., AND MARIE F. SYLVESTER, OF BOSTON, MASS.

MACHINE FOR CLEANING AND SCOURING RICE, &c.

SPECIFICATION forming part of Letters Patent No. 255,343, dated March 21, 1882.

Application filed March 16, 1881. (No model.)

*To all whom it may concern:*

Be it known that I, DAVID L. SHOEMAKER, of Washington, in the county of Washington and District of Columbia, have invented a certain new and Improved Machine for Cleaning and Scouring Rice and other Grain; and I do hereby declare the following to be a full, clear, and exact description of the same, reference being had to the accompanying drawings, forming part of this specification, in which—

Figure 1 is a longitudinal vertical section of my improved machine, taken on the line $x\,x$, Fig. 3; Fig. 2, an end elevation of the same; Fig. 3, a transverse section taken on the line $y\,y$, Fig. 1.

Similar letters of reference in the several figures denote the same parts.

My invention relates to improved machinery for cleaning and scouring rice and other grain; and it consists in certain novel combinations of devices, which will be first described and then made the subject of specific claims.

In the drawings, A represents the frame of the machine; B, the outer screen, and C the inner cylinder or screen.

The outer screen, B, is constructed preferably of wire-cloth, and, for convenience, is divided longitudinally into two parts or halves, as shown in Fig. 3. Various kinds of wire-cloth have been employed by me in the construction of the outer screen; but the most satisfactory results have been obtained with cloth woven of square wires. For ordinary rice in a good average condition, I have found that about ten or twelve meshes to the linear inch answers the purpose satisfactorily; but as the character and condition of the crop is liable to vary by reason of the different conditions of growing, harvesting, and storing it, whereby the rice is more or less easily cleaned, and also more or less easily broken, I recommend that the manufacturer provide himself with sets of outer screens having meshes of different degrees of fineness, and adapted to be substituted for each other, so that if the rice breaks more easily he can use a mesh of greater fineness, and, on the other hand, if the grains are tough and the skin adheres strongly, he can use a coarser mesh.

Extending longitudinally through the outer screen is a fan-shaft, D, provided with lateral arms $d$ and blades $d'$, and to these blades and arms the inner cylinder, C, is secured. The inner cylinder may consist wholly of wire-cloth or perforated sheet metal; but I preferably construct it of alternate wire-cloth sections $c$ and imperforate sheet-metal sections $c'$, as shown in Fig. 3, in order that the current of air induced by the fan may be forced through the perforated sections, thence through the rice, and out through the outer screen in the form of sharp blasts. A series of longitudinal brushes, E, are secured to the outside of the inner cylinder, C, preferably one over each blade and arm of the fan, and extend outward in close proximity to the outer screen, as shown in Figs. 1 and 3. Openings are made in one or both of the end casings of the machine for the admission of air to the interior of the inner cylinder.

In the operation of the machine a rapid rotary motion is imparted to the fan and to the inner cylinder secured thereto by power applied to the fan-shaft, and the hulled rice is fed in through a feed spout or hopper, F, at one end of the machine, and, passing down in between the inner cylinder and outer screen, partakes of the motion of the inner cylinder, and is carried round and round by the brushes, and kept in contact with the outer screen by centrifugal force until all the douce or skin is scoured off of it and forced by the air-blast out through the meshes of the outer screen. Owing to the close proximity of the inner cylinder and outer screen to each other, there is no opportunity for the rice to be thrashed about and broken up, but it is gradually scoured, and is finally delivered from the discharge-spout G of the machine in a merchantable condition without further screening. After passing through this scouring-machine the rice is preferably passed through another machine, termed a "polisher," similar to the one herein described, except that, in lieu of the outer screen, an outer cylinder of fine wire, leather, or rawhide is employed. When rawhide is used it is preferably applied with the hair side exposed as the polishing-surface, in order to obtain the best results. The polisher imparts to the rice a beautiful pearly appearance, which greatly enhances its merchantable value.

I have found by practical experience that the successful operation of the machine for cleaning the inner skin or douce from rice in the manner herein described depends upon two correlated conditions, to wit: the surface-speed of the parts which effect the cleaning or removal of the skin and the time during which the rice is subjected to the action of the cleaning mechanism, which must be so proportioned or graduated to each other that the rice will be effectually scoured or cleaned without being broken or injured. If the machinery runs too fast, the rice is liable to be broken; if too slow, it is not perfectly cleaned. If the rice is not retained in the machine a sufficient length of time, it is not perfectly cleaned, and if retained too long it is broken or injured. I have obtained excellent results with the scouring-surfaces six and one-half feet in length, the inner cylinder ten and three-fourths inches in diameter, the space between the inner cylinder and outer screen about one and one-half inch, with the brushes extending from the cylinder to within about an eighth of an inch of the outer screen, and with the fan-shaft and inner cylinder revolving about two hundred and seventy-five revolutions per minute, all said parts being constructed substantially as herein described, and as shown in the drawings; and I would recommend that in varying these proportions care be taken to secure substantially the same surface speed with the same rate of feed through the machine, or, in other words, that if the speed be increased or reduced, the rate of feed through the machine be proportionately increased or reduced, so that substantially the same amount of scouring action be obtained. As the rice, however, is liable to vary somewhat in condition from various causes, as I have above indicated, it may sometimes be found necessary to slightly increase or retard the rate of feed or the speed, or possibly both.

In my experience the operation of the machine can readily be varied to adapt it to rice of different conditions by slightly raising or depressing one end of the machine. Thus if the rate of feed should be increased it can easily be accomplished by raising the feed end or lowering the discharge end a few inches, so that the gravity of the rice will slightly assist its passage through the machine; and, on the other hand, if the rate of feed should be decreased, such result can be accomplished in a similar manner by lowering the feed end or raising the discharge end of the machine, in order that gravity may retard the progress of the grain through the machine. I have also in some cases decreased the scouring action of the machine upon the rice by removing a portion of the wire-cloth near the tail end of the outer screen, which may be put on in sections for that purpose, and in other cases have varied the speed of the inner cylinder.

The whole scouring-machine may be incased, if desired, and the douce or thin skin removed by the scouring operation and forced out through the outer cylinder may be drawn off from within said outer casing by a suction-fan and conveyed to any convenient place of deposit.

In this machine as here constructed it is absolutely necessary that the two scouring devices—to wit, the inner revolving cylinder and the outer stationary screen—should be arranged substantially horizontal, as they can be varied from that position only to a slight extent without entirely destroying the practical utility of the machine for the purposes of cleaning rice.

It will, of course, be seen that the wire-cloth screen can be made to revolve; but in this case care should be taken to arrange the surface speed of the parts with relation to each other substantially as I have above indicated, the practical results of the machine being entirely dependent upon the combination of the proper relative surface speed of the cleaning mechanisms with the proper relative movement of the grain through the machine between said cleaning surfaces or mechanisms.

The brushes are arranged, as above described, longitudinally of the cylinder to which they are attached, and not spirally, as I have found that with horizontal cylinders or scouring-surfaces a spiral arrangement of the brushes will either so accelerate or retard the movement of the grain (accordingly as the spiral may be arranged) as to destroy the efficiency of the machine. Of course, if the spiral be so slight as to produce no practical effect, it would be substantially the equivalent of the longitudinal arrangement, and would come within the limits of my invention.

The brushes which I have employed have been made of stiff bristles, although any equivalent substance may be employed. In a machine of the size herein described I have employed six brushes, each having a width of three rows of bristles and a length equal to the length of the inner cylinder, the spaces or pockets between the brushes being about seven inches in width. I have attached the bristles in the ordinary way to wooden strips about five-eighths of an inch thick and one inch wide and fastened said strips to longitudinal ribs of the inner cylinder. The front edges of the wooden strips may be covered with sheep-skin or other soft substance to prevent them from breaking the rice.

The air-blast should not be generated by a suction-fan drawing the air through a wire screen, but should be a positive blast, forcing the air through the part that carries the brushes, thence through the grain, and out through the wire screen.

When the machine is arranged as shown in the drawings, the blast may be generated, as shown, by a fan within the revolving cylinder, or by any equivalent means, either within or without the cylinder, which will produce a sufficient air-pressure within the inner cylinder to cause the air to pass through its perforations and out through the grain and the outer screen in the manner described.

Without the air-blast the douce or skin of the grain will collect in little masses or balls, attach themselves to the brushes, gradually obstructing their operation, and will finally break off and come out of the machine with the scoured rice, thus rendering the product impure and necessitating a subsequent cleaning operation of a different character. By reason of the oily nature of the douce it is very difficult to completely free the rice from it, except by the action of the positive blast, attacking and removing it entirely from the rice as fast as it is scoured off from the grains.

In the operation of this machine not only is the thin inner skin scoured off and removed from the rice, but the soft oily germ end of the berry is at the same time detached and removed, whereby the merchantable article is improved in quality and enabled to keep in good condition for a great length of time.

By the processes and machinery heretofore employed and now in general use for scouring and cleaning rice the hulled material has to be pounded in mortars for a time, averaging two hours, in order to remove the skin and germ ends. By the machine herein described, as shown by actual practical tests in the mill, this operation is accomplished in a better manner and resulting in a superior article in a time averaging about one-quarter of a minute, and with the expenditure of but a small fraction of the power required by the old process.

Having thus described my invention, I claim as new—

1. In a machine for cleaning and scouring rice and other grain, the combination, substantially as described, of a horizontal outer cylindrical screen, a horizontal revolving cylinder armed with longitudinal brushes which project in close proximity to the outer cylindrical screen, and means for forcing currents or blasts of air from the inner revolving cylinder out through the outer screen.

2. In a machine for cleaning and scouring rice, the combination, substantially as described, of a horizontal outer cylindrical screen, an inner revolving cylinder between which and the outer screen the rice is fed, longitudinal brushes on the inner cylinder projecting in close proximity to the outer screen and operating to press the rice against said outer screen to scour it, and a fan arranged within the inner cylinder for forcing a blast or blasts of air outward through the rice and through the outer screen to remove the scoured-off particles, substantially as described.

3. In a machine for cleaning and scouring rice, the combination of a horizontal outer cylindrical screen, an inner cylinder provided with longitudinal brushes projecting in close proximity to the outer screen, and an air-forcing fan for supporting and rotating the inner cylinder and forcing air currents or blasts out through it laterally and through the outer screen, substantially as described.

4. In a machine for cleaning and scouring rice, the combination of an outer cylindrical screen, an inner cylinder consisting of alternate perforated and imperforate sections and open at one or both ends, brushes on the outside of the inner cylinder, and a fan within said cylinder, whereby the air is directed from the fan through the perforated section of the inner cylinder in the form of sharp blasts, substantially as described.

DAVID L. SHOEMAKER.

Witnesses:
M. CHURCH,
FRED F. CHURCH.